(12) United States Patent
Wege et al.

(10) Patent No.: US 6,420,491 B1
(45) Date of Patent: Jul. 16, 2002

(54) METHOD FOR HYDROGENATING AROMATIC POLYMERS IN THE PRESENCE OF HYDROCARBONS WHICH CONTAIN OXYGEN

(75) Inventors: Volker Wege, Krefeld; Johann Rechner, Kempen; Eberhard Zirngiebl, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/743,830
(22) PCT Filed: Jul. 12, 1999
(86) PCT No.: PCT/EP99/04880
§ 371 (c)(1), (2), (4) Date: Jan. 16, 2001
(87) PCT Pub. No.: WO00/05278
PCT Pub. Date: Feb. 3, 2000

(30) Foreign Application Priority Data

Jul. 23, 1998 (DE) .......................... 198 33 095

(51) Int. Cl.$^7$ .................................................. C08F 8/04
(52) U.S. Cl. ................. 525/338; 525/330.3; 525/330.9; 525/333.3; 525/339; 525/390; 525/396; 525/397; 525/419; 525/437; 525/442; 525/534; 525/535; 525/537
(58) Field of Search ................................ 525/338, 339, 525/390, 396, 397, 419, 437, 442, 534, 535, 537

(56) References Cited

U.S. PATENT DOCUMENTS 4,892,928 A 1/1990 Hoxmeier ................... 525/338
4,997,898 A 3/1991 Ishihara et al. ............. 526/308

FOREIGN PATENT DOCUMENTS

| EP | 378 104 | 7/1990 |
| EP | 814 098 | 12/1997 |
| GB | 933127 | 8/1963 |
| GB | 933 596 | * 8/1963 |
| GB | 1513852 | 6/1978 |
| WO | 96/34896 | 11/1996 |

OTHER PUBLICATIONS

Applied Heterogenous Catalysis, Institute Francais du Petrole Publications, (month unavailable), 1987, pp. 187–237, Study of the physico–chemicalcharacteristics of the catalytic solid.

*Chemical Abstracts, vol. 119, No. 10, Sep. 6, 1993, Abstract No. 96524y, XP000400853 & JP 05 039315 A (Shinnittetsu Kagaku) Feb. 19, 1993.

* cited by examiner

Primary Examiner—Bernard Lipman
(74) Attorney, Agent, or Firm—Joseph C. Gil; Aron Preis; James R. Franks

(57) ABSTRACT

A catayltic process for the hydrogenation of aromatic polymers is disclosed. The catalyst used in the process is a metal or mixture of metals of sub-group VIII of the periodic table together with a support of silicon dioxide, aluminum oxide or a mixture thereof. The catalyst, having pores is characaterized in that the pores having diameters of 100 to 1,000 Å constitute less than 15 percent of the total volume of pores. The hydrogenation, that is carried out in the presence of at least one oxygen-containing hydrocarbon is characterized in that it is essentially complete and without significant degradation of molecular weights.

7 Claims, No Drawings

METHOD FOR HYDROGENATING AROMATIC POLYMERS IN THE PRESENCE OF HYDROCARBONS WHICH CONTAIN OXYGEN

The invention relates to a process for the hydrogenation of aromatic polymers, which is characterized in that metals of sub-group VIII are present together with a support of silicon dioxide or aluminium oxide or mixtures thereof. The catalysts have a pore size distribution which is characterized in that the pore volume between 100 and 1,000 Å is less than 15%. The process is carried out in the presence of an oxygen-containing hydrocarbon which accelerates the reaction, and hydrogenates aromatic polymers completely with respect to their aromatic units and without significant degradation of the molecular weights.

The hydrogenation of aromatic polymers is already known. DE-AS 1 131 885 describes the hydrogenation of polystyrene in the presence of catalysts and solvents. Aliphatic and cycloaliphatic hydrocarbons, ethers, alcohols and aromatic hydrocarbons are mentioned as solvents. A mixture of cyclohexane and tetrahydrofuran is mentioned as preferred. Silicon dioxide and aluminium oxide supports of the catalysts are mentioned generally, but their physicochemical structure is not described.

EP-A-322 731 describes the preparation of chiefly syndiotactic polymers based on vinylcyclohexane, a styrene-based polymer being hydrogenated in the presence of hydrogenation catalysts and solvents. Cycloaliphatic and aromatic hydrocarbons, but not ethers, are mentioned as solvents.

The ruthenium or palladium catalysts described in DE-OS 196 24835 (=EP-A 814 098) for the hydrogenation of polymers, in which the active metal is applied to a porous support, catalyse the hydrogenation of olefinic double bonds of polymers.

It is furthermore known (WO 96/34896=U.S. Pat. No. 5,612,422) that small pore diameters (200–500 Å) and large surface areas (100–500 m$^2$/g) of catalysts assisted by silicon dioxide lead to incomplete hydrogenation and to degradation of the polymer chain in the hydrogenation of aromatic polymers. The use of specific hydrogenation catalysts assisted by silicon dioxide (WO 96/34896) allows an almost complete hydrogenation with approx. 20% degradation of the molecular weights. The catalysts mentioned have a specific pore size distribution of the silicon dioxide, which is characterized in that 98% of the pore volume has a pore diameter greater than 600 Å. The catalysts mentioned have surface areas of between 14 and 17 m$^2$/g and an average pore diameter of 3,800–3,900 Å. Dilute polystyrene solutions in cyclohexane (polymer concentration between 1% and a maximum of 8%) are hydrogenated to degrees of hydrogenation of greater than 98% and less than 100%.

The examples described in the publications mentioned show a degradation of the absolute molecular weights of the hydrogenated polystyrene at polymer concentrations of less than 2%. Generally, molecular weight degradation leads to a deterioration of the mechanical properties of a hydrogenated polystyrene.

The comparison example according to WO 96/34896 of a commercially available catalyst of 5% Rh/Al$_2$O$_3$ (Engelhard Corp., Beachwood, Ohio, USA) leads to a degree of hydrogenation of 7% and shows a lower activity of the aluminium oxide support compared with the catalyst assisted by silicon dioxide.

Surprisingly, it has now been found that if commercially available standard hydrogenation catalysts for low molecular weight compounds which comprise metals of sub-group VIII, together with a support of silicon dioxide, aluminium oxide or a mixture thereof, and which are defined in that the pore volume between 100 and 1,000 Å is less than 15% are used in the presence of an oxygen-containing hydrocarbon, aromatic polymers hydrogenate completely and without a significant degradation of the molecular weights.

The process is distinguished by the fact that no noticeable degradation of the end product occurs, in particular also at high polymer concentrations (e.g. >20%). Furthermore, on addition of oxygen-containing hydrocarbons, an increase in the activity of the catalyst is to be observed, which manifests itself by lower reaction temperatures at shorter reaction times for complete hydrogenation (example 2, 3). The addition of this oxygen-containing hydrocarbon allows higher polymer-catalyst ratios for complete hydrogenation than the use of purely aliphatic systems. The reactions can be carried out under identical conditions at lower pressures for complete hydrogenation.

The invention provides a process for the hydrogenation of aromatic polymers in the presence of catalysts and in the presence of an oxygen-containing hydrocarbon, wherein the catalyst is a metal or mixture of metals of sub-group VIII of the periodic table together with a support of silicon dioxide, aluminium oxide or a mixture thereof and the pore volume of the pore diameter of the catalyst between 100 and 1,000 Å, measured by mercury porosimetry, is less than 15% (preferably 2 to 12%), based on the total pore volume, measured by mercury porosimetry. The average pore diameter, determined by mercury porosimetry, is not more than 900 Å.

However, the mercury method is only sufficiently accurate for pores which are greater than 60 Å. Pore diameters of less than 600 Å are therefore determined by nitrogen absorption, the process according to Barrett, Joyner and Halenda, according to DIN 66 134.

The catalysts additionally have a pore volume, measured by nitrogen absorption, of 100 to 10%, preferably 80 to 10%, in particular 70 to 15% for pore diameters of <600 Å. The pore volume, measured by nitrogen absorption, is based on the total pore volume, measured by mercury porosimetry.

The average pore diameter and the pore size distribution are determined by mercury porosimetry in accordance with DIN 66133.

The catalysts comprise metals of sub-group VIII, which are present together with a support of silicon dioxide or aluminium oxide or mixtures thereof.

The catalysts characterized in this way have a pore size distribution which is characterized in that 100 to 10% preferably 80 to 10%, especially preferably 70 to 15% of the pore volume has a pore diameter of less than 600 Å determined by nitrogen absorption, from the total pore volume measured by mercury porosimetry (pore diameter of 36.8 Å to 13 $\mu$m).

The average pore diameter is in general 10 to 1,000 Å, preferably 50 to 950 Å, especially preferably 60 to 900 Å.

The specific nitrogen surface areas (BET) are in general 80 to 800 m$^2$/g, preferably 100 to 600 m$^2$/g.

Metals of sub-group VIII, preferably nickel, platinum, ruthenium, rhodium and palladium, are in general used.

The metal content is in general 0.01 to 80%, preferably 0.05 to 70%, based on the total weight of the catalyst.

The 50% value of the cumulative distribution of the particle size in the process carried out discontinuously is in general 0.1 $\mu$m to 200 $\mu$m, preferably 1 $\mu$m to 100 $\mu$m, especially preferably 3 $\mu$m to 80 $\mu$m.

The conventional solvents for hydrogenation reactions are used as solvents. These are in general aliphatic and cycloaliphatic hydrocarbons, ethers, alcohols and aromatic hydrocarbons. Cyclohexane, tetrahydrofuran or a mixture thereof are preferred.

Some or all the solvent is replaced by an oxygen-containing hydrocarbon or a mixture of such compounds.

Oxygen-containing hydrocarbons are preferably ethers having up to 20 carbon atoms and up to 10, preferably up to 6 oxygen atoms, polyether with $C_1$–$C_4$-alkyl units between the oxygen atoms and molecular weights of between 100 and 100,000 g mole$^{-1}$, $C_1$–$C_{20}$-alkanols or $C_1$–$C_8$-alkoxy-$C_1$–$C_8$-alkyl compounds, or cyclic ethers having 3–12 carbon atoms and 1 to 6 oxygen atoms.

The alkyl radicals are in each case straight-chain or branched.

Diethyl ether, ethylene glycol diethyl ether, ethylene glycol dimethyl ether, diethylene glycol dimethyl ether, diethylene glycol diethyl ether, tetrahydrofuran, dioxane, trioxane and crown ethers, e.g. [18]-crown-6 and [12]-crown-4, are particularly preferred.

The reaction is in general carried out at concentrations of the oxygen-containing component with respect to the total solvent of 0.1% to 100%, preferably 1% to 60%, especially preferably 5% to 50%.

The process according to the invention in general leads to a practically complete hydrogenation of the aromatic units. As a rule, the degree of hydrogenation is $\geq 80\%$, preferably $\geq 90\%$, especially preferably $\geq 99\%$ to 100%. The degree of hydrogenation can be determined, for example, by NMR or WV spectroscopy.

The starting substances employed are aromatic polymers, which are chosen, for example, from polystyrene which is optionally substituted in the phenyl ring or on the vinyl group, or copolymers thereof with monomers chosen from the group consisting of olefins, (meth)acrylates or mixtures thereof. Further suitable polymers are aromatic polyethers, in particular polyphenylene oxide, aromatic polycarbonates, aromatic polyesters, aromatic polyamides, polyphenylenes, polyxylylenes, polyphenylene-vinylenes, polyphenylene-ethylenes, polyphenylene sulfides, polyaryl ether ketones, aromatic polysulfones, aromatic polyether sulfones, aromatic polyimides and mixtures and copolymers thereof, optionally copolymers with aliphatic compounds.

Possible substituents in the phenyl ring are $C_1$–$C_4$-alkyl, such as methyl and ethyl, $C_1$–$C_4$-alkoxy, such as methoxy and ethoxy, or fused-on aromatics which are bonded to the phenyl ring via a carbon atom or two carbon atoms, such as phenyl, biphenyl and naphthyl.

Possible substituents on the vinyl group are $C_1$–$C_4$-alkyl, such as methyl, ethyl or n-or iso-propyl, in particular methyl in the α-position.

Possible olefinic comonomers are ethylene, propylene, isoprene, isobutylene, butadiene, cyclohexadiene, cyclohexene, cyclopentadiene, optionally substituted norbornenes, optionally substituted dicyclopentadienes, optionally substituted tetracyclododecenes, optionally substituted dihydrocyclopentadienes, $C_1$–$C_8$-, preferably $C_1$–$C_4$-alkyl esters of (meth)acrylic acid, preferably the methyl and ethyl esters, $C_1$–$C_8$-, preferably $C_1$–$C_4$-alkyl ethers of vinyl alcohol, preferably the methyl and ethyl ether, $C_1$–$C_8$-, preferably $C_1$–$C_4$-alkyl esters of vinyl alcohol, preferably vinyl acetate, and derivatives of maleic acid, preferably maleic anhydride, and derivatives of acrylonitrile, preferably acrylonitrile and methacrylonitrile.

Preferred polymers are polystyrene, polymethylstyrene and copolymers of styrene and at least one further monomer chosen from the group consisting of α-methylstyrene, butadiene, isoprene, acrylonitrile, methyl acrylate, methyl methacrylate, maleic anhydride and olefins, such as, for example, ethylene and propylene. Copolymers of acrylonitrile, butadiene and styrene, copolymers of acrylic esters, styrene and acrylonitrile, copolymers of styrene and α-methylstyrene and copolymers of propylene, diene and styrene, for example, are possible.

The aromatic polymers in general have molecular weights (weight-average) $\overline{M}_w$ of 1,000 to 10,000,000 preferably 60,000 to 1,000,000, particularly preferably 70,000 to 600,000, in particular 100,000 to 480,000, determined by light scattering.

The polymers can have a linear chain structure and can also have branching positions due to co-units (e.g. graft copolymers). The branching centres comprise e.g. star-shaped polymers or other geometric shapes of the primary, secondary, tertiary or optionally quaternary polymer structure.

The copolymers can be present both randomly, in alternation and as blocked copolymers.

Block copolymers comprise di-blocks, tri-blocks, multi-blocks and star-shaped block copolymers.

The amount of catalyst to be employed is described, for example, in WO 96/34896.

The amount of catalyst to be employed depends on the process to be carried out; this can be carried out continuously, semi-continuously or discontinuously.

In the continuous system, the reaction time is considerably shorter; it is influenced by the dimensions of the reaction vessel. In the continuous procedure, the trickle system and the sump system, both with catalysts arranged in a fixed bed, are just as possible as a system with catalyst which is suspended and e.g. circulated. The catalysts arranged in a fixed bed can be present in tablet form or as extrudates.

The polymer concentrations, based on the total weight of solvent and polymer, in the discontinuous process are in general 80 to 1, preferably 50 to 10, in particular 40 to 15% by weight.

Methods for characterizing hydrogenation catalysts are described e.g. in WO 96/34896 (=U.S. Pat. No. 5,612,422) and Applied Heterogenous Catalysis, Institute Francais du Petrole Publication, page 189–237 (1987).

The reaction is in general carried out at temperatures between 0 and 500° C., preferably between 20 and 250° C., in particular between 60 and 200° C.

The reaction is in general carried out under pressures of 1 bar to 1,000 bar, preferably 20 to 300 bar, in particular 40 to 200 bar.

EXAMPLES

The absolute molecular weights $\overline{M}_w$ (weight-average) of the starting polymer and of the hydrogenated product are determined by light scattering. Membrane osmosis gives the absolute molecular weight $\overline{M}_n$(number-average). In examples 3, 4 and 5, the relative values of the GPC measurement with respect to polystyrene standards correspond to the absolute molecular weights determined for the polystyrene employed.

Examples 1–5

A 1 l autoclave is flushed with inert gas. The polymer solution and the catalyst are added (table 1). After closing, the autoclave is charged several times with inert gas and then with hydrogen. After letting down, the particular hydrogen pressure is established and the batch is heated to the corresponding reaction temperature, while stirring. The reaction pressure is kept constant after the uptake of hydrogen has started.

The reaction time is the time from heating up the batch to complete hydrogenation of the polystyrene or, in the case of incomplete hydrogenation, the time up to which the uptake of hydrogen tends towards its saturation value.

When the reaction has ended, the polymer solution is filtered. The product is precipitated in methanol and dried. The product isolated has the physical properties shown in table 1.

The catalysts employed are characterized in table 2.

(a) a solvent comprising, (i) a hydrocarbon selected from at least one of a cycloaliphatic hydrocarbon and an aliphatic hydrocarbon, and (ii) at least one oxygen-containing hydrocarbon, in the presence of (b) a catalyst comprising, (i) a support comprising at least one of silicon dioxide and aluminum oxide, and (ii) at least one metal of sub-group VIII of the periodic table of the elements, wherein said catalyst has pores having a pore diameter of 100 to 1000 Å which constitute less than 15 percent of the total volume of pores, said pore volume being determined by

TABLE 1

Hydrogenation of polystyrene as a function of the catalyst, solvent system and reaction temperature

| Example no. | Catalyst no. | Polymer weight g | Solvent[3] ml | Catalyst weight g | Reaction temperature °C. | $H_2$ pressure bar | Reaction time h | Degree of hydrogenation[1] % | Tg (DSC) °C. | $\overline{M}_n$ $10^3$ g/mole | $\overline{M}_w$ $10^3$ g/mole |
|---|---|---|---|---|---|---|---|---|---|---|---|
| Comparison 1 | 1 | 100.2[2] | 300 CYH | 12.5 | 160 | 100 | 13 | 98.5 | 148 | 70.0 | 170.4 |
| Comparison 2 | 1 | 100.2[2] | 300 CYH | 12.5 | 200 | 100 | 7 | 100 | 148 | 47.5 | 108.1 |
| 3 according to the invention | 1 | 100.2[2] | 200 CYH + 100 THF | 12.5 | 160 | 100 | 7 | 100 | 148 | 69.8 | 176.4 |
| 4 according to the invention | 2 | 100.2[2] | 200 CYH + 100 THF | 12.5 | 160 | 100 | 7 | 100 | 148 | 70.1 | 178.2 |
| 5 according to the invention | 2 | 100.2[2] | 200 CYH + 100 Glyme | 12.5 | 160 | 100 | 7 | 100 | 148 | 69.7 | 177.3 |

[1] Determined by $^1$H-NMR spectroscopy
[2] Polystyrene type 158 k, $\overline{M}_w$ = 280,000 g/mole, BASF AG, Ludwigshafen, Germany
[3] CYH = cyclohexane
THF = tetrahydrofuran
Glyme = ethylene glycol dimethyl ether

TABLE 2

Physical characterization of the catalysts employed

| Catalyst no. | Nitrogen pore volume for pore diameter <600 Å $mm^3/g$ | Total mercury pore volume for pore diameter 36.8 Å – 13μm $mm^3/g$ | $N_2$ pore volume for pore diameters <600 Å/total mercury pore volume % | Pore volume (measured by mercury porosimetry) for pore diameters 100 Å–1000 Å $mm^3/g$ | Pore volume for pore diameters 100–1000 Å total pore volume (measured by mercury porosimetry) % | Average pore diameter[1] Å | Specific total surface area (BET)[2] $m^2/g$ | Metal content % |
|---|---|---|---|---|---|---|---|---|
| 1 | 275 | 1,088 | 25 | 110 | 10 | 333 | 142 | 62.2 |
| 2 | 280 | 1,158 | 24 | 130 | 11 | 412 | 132 | 62.8 |

Catalyst no. 1: Aldrich, Steinheim, Germany, nickel on silicon dioxide/aluminium oxide, order no. 20 877-9
Catalyst no. 2: Engelhard, De Meern B.V., The Netherlands Ni-5136P, nickel on silicon dioxide/aluminium oxide
[1] Average pore diameter by mercury porosimetry (DIN 66 133)
[2] Specific nitrogen total surface area in accordance with Brunauer, Emmett and Teller (BET, DIN 66131, DIN 66132)

The nickel catalyst (table 1) hydrogenates polystyrene at 160° C. in a reaction time of 13 hours incompletely to the extent of 98.5% (comparison example 1). At 200° C., complete hydrogenation is already achieved after 7 h, but with a drastic decrease in the molecular weight (comparison example 2). On the other hand, the process according to the invention leads to a reduction in the reaction temperature required for complete hydrogenation with a far shorter reaction time and while retaining the absolute molecular weights $\overline{M}_n$ and $\overline{M}_w$, compared with the starting polymer (example 3, 4, 5).

What is claimed is:

1. A process comprising, hydrogenating an aromatic polymer in, mercury porosimetry, and 80 to 10% of the pore volume constitute pores having diameters smaller than 600 Å.

2. The process of claim 1 wherein said hydrocarbon (a)(i) is cyclohexane, and said oxygen-containing hydrocarbon (a)(ii) is selected from at least one of tetrahydrofuran and ethyleneglycol dimethyl ether.

3. The process of claim 1 wherein said metal (b)(ii) is selected from nickel.

4. The process of claim 1 wherein 70 to 15% of the pore volume constitute pores having diameters smaller than 600 Å.

5. The process of claim 1 wherein said oxygen-containing hydrocarbon (a)(ii) is at least one member selected from the group consisting of ethers having up to 20 C atoms and up to 6 oxygen atoms, polyethers with $C_1$–$C_4$-alkyl units between the oxygen atoms and molecular weights of 100 to 100,000 g/mole, $C_{1-C20}$-alkanols, $C_1$–$C_8$-alkoxy-$C_1$–$C_8$-alkyl compounds and cyclic ethers having 3 to 12 C atoms and 1 to 5 oxygen atoms.

6. The process of claim 1 wherein said oxygen-containing hydrocarbon (a)(ii) is at least one member selected from the group consisting of diethyl ether, ethylene glycol dimethyl ether, ethylene glycol diethyl ether, diethylene glycol dimethyl ether, diethylene glycol diethyl ether, tetrahydrofuran, dioxane, trioxane and crown ethers.

7. The process of claim 1 wherein said oxygen-containing containing hydrocarbon (a)(ii) is present in a concentration of 1 to 60%.

* * * * *